(12) United States Patent
Evans et al.

(10) Patent No.: US 9,010,438 B2
(45) Date of Patent: Apr. 21, 2015

(54) FLUID TREATMENT SYSTEM

(75) Inventors: Wayne Evans, Gloucestershire (GB);
Neville Ernest Lange, Gloucester (GB)

(73) Assignee: VWS Westgarth Limited, Glasgow (GB)

(*) Notice: Subject to any disclaimer, the term of this patent is extended or adjusted under 35 U.S.C. 154(b) by 89 days.

(21) Appl. No.: 12/936,244

(22) PCT Filed: Mar. 25, 2009

(86) PCT No.: PCT/GB2009/000773
§ 371 (c)(1),
(2), (4) Date: Nov. 30, 2010

(87) PCT Pub. No.: WO2009/122134
PCT Pub. Date: Oct. 8, 2009

(65) Prior Publication Data
US 2012/0073822 A1    Mar. 29, 2012

(30) Foreign Application Priority Data

Apr. 4, 2008    (GB) .................................. 0806172.3

(51) Int. Cl.
| E21B 7/12 | (2006.01) |
| E21B 43/36 | (2006.01) |
| B01D 61/02 | (2006.01) |
| B01D 61/12 | (2006.01) |
| C02F 1/44 | (2006.01) |
| E21B 43/16 | (2006.01) |
| C02F 101/32 | (2006.01) |
| C02F 103/08 | (2006.01) |

(52) U.S. Cl.
CPC .............. *E21B 43/36* (2013.01); *B01D 61/025* (2013.01); *B01D 61/027* (2013.01); *B01D 61/12* (2013.01); *B01D 2311/14* (2013.01); *B01D 2311/18* (2013.01); *C02F 1/44* (2013.01); *C02F 1/441* (2013.01); *C02F 1/442* (2013.01); *C02F 1/444* (2013.01); *C02F 2101/32* (2013.01); *C02F 2103/08* (2013.01); *E21B 43/16* (2013.01)

(58) Field of Classification Search
CPC ...................................................... E21B 43/34
USPC ................ 166/357, 336, 368, 366, 68–71
See application file for complete search history.

(56) References Cited

U.S. PATENT DOCUMENTS

| 2,159,434 | A | * | 5/1939 | Frey .............................. 210/640 |
| 3,630,002 | A | * | 12/1971 | Burrus ........................... 96/164 |
| 4,116,288 | A | * | 9/1978 | Love .............................. 175/66 |
| 4,719,016 | A | | 1/1988 | Storkebaum et al. |
| 4,744,420 | A | * | 5/1988 | Patterson et al. ............. 166/312 |

(Continued)

FOREIGN PATENT DOCUMENTS

| DE | 3531834 C1 | 9/1986 |
| EP | 0343394 A1 | 11/1989 |
| WO | 2004/090284 | 10/2004 |

*Primary Examiner* — Matthew Buck
*Assistant Examiner* — Aaron Lembo
(74) *Attorney, Agent, or Firm* — Coats and Bennett, PLLC

(57) ABSTRACT

A fluid treatment system comprises a fluid treatment module having a fluid inlet and first and second fluid outlets. A pump is provided to establish a first pressure differential between the fluid inlet and one of the first and second fluid outlets of the fluid treatment module, and an eductor is provided to establish a second pressure differential between the fluid inlet and the other of the first and second fluid outlets of the fluid treatment module. The pump is adapted to deliver a motive fluid to the eductor.

17 Claims, 7 Drawing Sheets

(56) References Cited

U.S. PATENT DOCUMENTS

| | | | |
|---|---|---|---|
| 4,792,284 A | 12/1988 | Straub et al. | |
| 4,905,505 A * | 3/1990 | Reed | 73/64.46 |
| 5,300,222 A * | 4/1994 | Broussard, Sr. | 210/202 |
| 5,490,562 A * | 2/1996 | Arnold | 166/267 |
| 6,004,024 A * | 12/1999 | Ho et al. | 366/167.1 |
| 6,196,314 B1 * | 3/2001 | Chen | 166/275 |
| 7,093,661 B2 * | 8/2006 | Olsen | 166/357 |
| 7,140,441 B2 * | 11/2006 | Hauge et al. | 166/357 |
| 7,600,567 B2 * | 10/2009 | Christopher et al. | 166/275 |
| 7,703,518 B2 * | 4/2010 | Phillippi et al. | 166/267 |
| 7,708,059 B2 * | 5/2010 | Shaw | 166/105.5 |
| 8,186,442 B2 * | 5/2012 | Breivik et al. | 166/345 |
| 2003/0188873 A1 | 10/2003 | Anderson et al. | |
| 2004/0140099 A1 * | 7/2004 | Hauge et al. | 166/357 |
| 2005/0173322 A1 | 8/2005 | Ostergaard | |
| 2007/0131429 A1 * | 6/2007 | Brammer | 166/357 |
| 2007/0186770 A1 | 8/2007 | Heath et al. | |

* cited by examiner

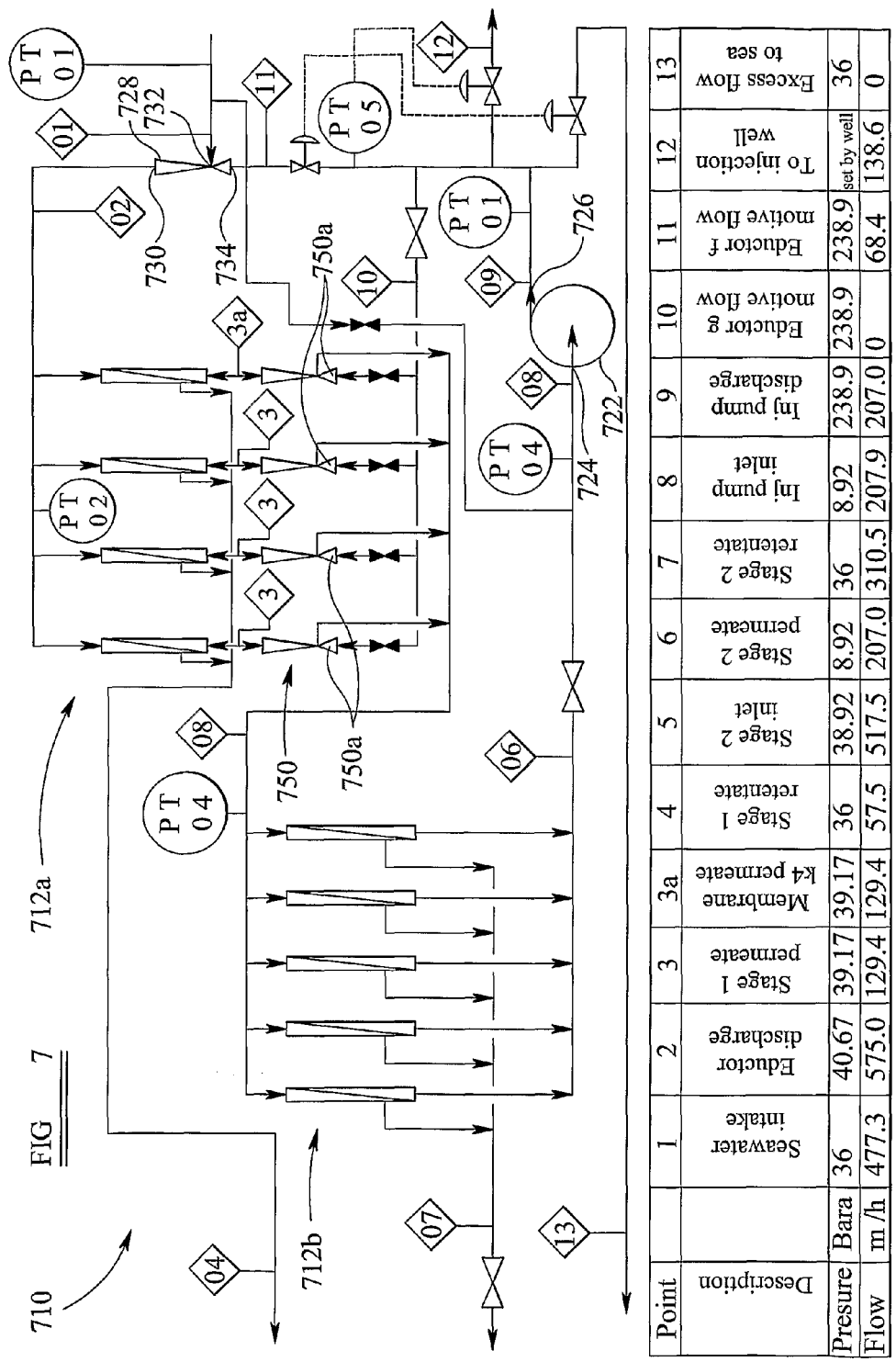

FLUID TREATMENT SYSTEM

This application is a U.S. National Stage Application of PCT Application No. PCT/GB2009/000773, with an international filing date of 25 Mar. 2009. Applicant claims priority based on United Kingdom Patent Application No. 0806172.3 filed 4 Apr. 2008. The subject matter of these applications is incorporated herein.

FIELD OF THE INVENTION

The present invention relates to a fluid treatment apparatus, and in particular, but not exclusively, to a fluid treatment apparatus for treating a fluid to be injected into a subterranean hydrocarbon bearing formation. The present invention has application in subsea environments.

BACKGROUND TO THE INVENTION

Extracting hydrocarbons from a subterranean formation involves flowing hydrocarbons from the formation to surface through a production well bore. In the early stages of production, the hydrocarbons are driven into the production well and flowed to surface by pressure within the formation. However, over time the formation pressure reduces until natural extraction can no longer be sustained, at which stage some form of artificial or assisted extraction is required. One common form of artificial extraction involves the injection of a fluid medium into the depleting formation through an injection well bore which extends from surface in order to displace the hydrocarbons from the formation. Conventionally, the fluid medium is aqueous and may be produced water or sea water or the like. Fluid injection in this manner may also be utilised as a form of matrix support in order to prevent collapse of the reservoir after the hydrocarbons have been removed.

Where water injection is utilised to displace hydrocarbons from the formation, or provide matrix support, it is important that the injection water is compatible with the formation chemistry and is substantially free from suspended or dissolved particles and colloidal and macromolecular matter. This is required to prevent or at least minimise plugging of the formation and associated wells, which occurs when precipitates or suspended particles or the like accumulate and block, or plug, fluid passageways. Such fluid passageways may include pores, fractures, cracks or the like in the hydrocarbon-bearing rock formation, or passageways defined by production and injection well bores. This plugging can significantly reduce hydrocarbon production and in severe cases can terminate production altogether.

In order to ensure that the injection fluid or water is substantially free from suspended or dissolved particles and the like, it is known in the art to treat the water prior to injection into the formation. Treatment normally includes a combination of chemical and mechanical or physical processes. For example, coagulants or flocculants may be added to the water to encourage flocculation where heavy particles or flocculus, known as "floc", are formed. The floc may then be removed by sedimentation and/or by filtration whereby mechanical straining removes a proportion of the particles by trapping them in the filter medium. Conventional filtration apparatus for use in treating injection water to remove such particulate material include filtration or separation membranes, multimedia filters and the like.

With regards to plugging caused by precipitate formation and accumulation, this occurs when ionic species in the injection fluid or water combines or reacts with compatible ionic species in water present in the formation producing a precipitate or scale. For example, divalent sulphate anions in the injection water will combine with various cations which may be present in the formation water to form substantially insoluble precipitates. For example, the formation water may contain, among others: barium cations, which when combined with sulphate produces a barium-sulphate or barite precipitate; strontium cations resulting in the formation of a strontium-sulphate precipitate; or calcium cations resulting in the formation of a calcium-sulphate or anhydrite precipitate or scale. As noted above, these resultant precipitates are substantially insoluble, particularly barite, making any precipitate purging and removal/squeezing process extremely difficult, complicated and expensive.

Additionally, the presence of sulphate in the injection fluid or water provides a source of sulphur which thermophilic sulphate reducing bacteria (SRB) that may be present in the formation feed on, producing hydrogen-sulfide which causes souring of the well. Hydrogen-sulfide is extremely corrosive and specialised equipment must be used to accommodate the "sour" hydrocarbons, both at the extraction/production stage and at the processing stage. Using injection water with a high sulphate content can therefore sour an originally "sweet" well.

Various methods have been proposed to provide a preventative solution by removing the problematic, or precursor divalent ions from the injection water before injection into the formation. For example, prior art reference U.S. Pat. No. 4,723,603 discloses a process in which a feed water is treated to remove precursor ions by a process of reverse osmosis to produce a treated injection water product.

In offshore environments, a significant proportion of platform space is dedicated to fluid treatment systems, such as injection water treatment systems. This presents problems in view of the limited space available in these environments. Furthermore, known filtration or separation systems operate by creating pressure differentials across the filtration media, for example across membranes and the like, which typically involves the use of specialised plant equipment, such as pumping systems and fluid control equipment including valves and the like. Such plant equipment requires dedicated space and an energy source and is susceptible to mechanical failure. These problems are also true for any separation system, including those outside the mineral extraction industries, such as desalination for generating potable water, power generation and the like.

SUMMARY OF THE INVENTION

According to a first aspect of the present invention there is provided a fluid treatment system comprising:

a fluid treatment module comprising a fluid inlet and first and second fluid outlets;

a pump adapted to establish a first pressure differential between the fluid inlet and one of the first and second fluid outlets of the fluid treatment module; and an eductor adapted to establish a second pressure differential between the fluid inlet and the other of the first and second fluid outlets of the fluid treatment module, wherein the pump is adapted to deliver a motive fluid to the eductor.

In use, the first pressure differential may facilitate communication of a fluid between the fluid inlet and one of the first and second fluid outlets of the fluid treatment module, and the second pressure differential may facilitate communication of the fluid between the fluid inlet and the other of the first and second fluid outlets.

The system of the present invention advantageously permits the required fluid pressure differentials across the fluid treatment module to be established by use of a single pump, which single pump may establish the first pressure differential and also provide the motive fluid for operation of the eductor to establish the second fluid pressure differential. Accordingly, the quantity of fluid handling equipment may be minimised, with associated benefits in terms of reduced plant space, reduced system complexity, reduced costs and the like.

The system may be adapted for use in treating a fluid to be injected into a subterranean formation, such as a hydrocarbon bearing formation. The treated fluid may comprise sea water, for example. Alternatively, or additionally, the treated fluid may comprise fluid produced from a subterranean formation. Alternatively, the system may be adapted for use in treating a fluid for other industrial or domestic purposes, such as in generating potable water, power generation and the like. Alternatively further, the system may be adapted for use in environmental applications, for example cleaning fluids prior to disposal.

In embodiments of the invention the pump may be arranged to deliver fluid at a required pressure to a final destination, such as a subterranean destination, an industrial or domestic process, an end user or the like. In this arrangement a portion of the fluid from the pump may be communicated to the final destination and a portion may be communicated to the eductor. In embodiments of the invention the pump may function as an injection pump.

The system may be adapted for use in a subsea environment. This permits the associated equipment, or at least a proportion of the associated equipment, to be mounted remotely from an offshore platform, providing significant advantages in terms of space saving and the like.

In embodiments where the system is adapted for subsea use, the system may be arranged to treat ambient sea water. This arrangement eliminates or reduces complexities involved in delivering fluid from a remote source to a treatment system. Furthermore, this arrangement facilitates exploitation of the hydrostatic pressure within the subsea environment. For example, locating the system at a depth of, say, 350 meters will expose the system to a hydrostatic pressure of approximately 36 bar. Facilitating use of ambient pressures also assists to ensure that the pump operates at a positive pressure, and also assists to ensure that fluid is delivered to the pump above its required Net Positive Suction Head (NPSH). This may eliminate any requirement for pre-conditioning or primary pumping systems.

One of the first and second pressure differentials may be established to facilitate communication of fluid to be treated from a fluid source to the fluid inlet of the fluid treatment module, and the other of the first and second pressure differentials may be established to facilitate communication of the fluid to be treated through the fluid treatment module to thus be treated therein.

One or both of the first and second fluid pressure differentials may be established with reference to the ambient pressure. Accordingly, ambient fluid may be communicated to the fluid treatment module by virtue of the appropriate pressure differential.

The fluid treatment module may be adapted to treat a fluid by reducing the concentration of at least one component of the fluid, such as particulate components, ionic components and the like. The fluid treatment module may comprise at least one filtration or separation medium. The filtration or separation medium may comprise a membrane, such as a reverse osmosis membrane, nano-filtration membrane, ultra-filtration membrane or the like, or any suitable combination thereof. Alternatively, or additionally, the filtration or separation medium may comprise strainers, sieves or the like.

The first fluid outlet of the fluid treatment module may accommodate treated fluid with a reduced concentration of a selected component. This portion of the treated fluid may conveniently be termed a permeate. The second fluid outlet of the fluid treatment module may accommodate treated fluid with an increased concentration of a selected component. This portion of the treated fluid may conveniently be termed a retentate. One or both of the permeate and retentate may define a useable product. For example, the permeate may be communicated to a final destination, and the retentate may be disposed of. Alternatively, a portion of the retentate and/or permeate may be recirculated within the fluid treatment system, for example to ensure a particular fluid condition is achieved, or to achieve a required flux rate of the fluid treatment module. In this respect, the use of fluid from the pump as a motive fluid for the eductor may facilitate additional control over fluid conditioning.

The pump may define at least one inlet or suction port and at least one outlet or delivery port. Similarly, the eductor may define at least one inlet or suction port and at least one outlet or delivery port. It will be understood by those of skill in the art that the eductor defines at least one motive fluid port. In this arrangement the delivery port of the pump may be in fluid communication with the motive fluid port of the eductor.

At least one of the first and second outlets of the fluid treatment module may be in fluid communication with the suction port of at least one of the pump and eductor. This arrangement may therefore establish a pressure at one or both of the first and second fluid outlets which is less than the fluid pressure at the fluid inlet. In some embodiments of the invention the fluid inlet of the fluid treatment apparatus may be in fluid communication with the delivery port of at least one of the pump and eductor.

The fluid treatment module may comprise a plurality of fluid inlets and more than two fluid outlets, and appropriate pressure differentials may be established across selected inlets and outlets.

A single fluid pump may be provided. A single eductor may be provided. Alternatively, a plurality of pumps or eductors may be provided In embodiments of the invention a single fluid treatment module may be provided. Alternatively, a plurality of fluid treatment modules may be provided. The plurality of fluid treatment modules may be serviced by a single pump and single eductor, or alternatively by more than one pump or eductor. The fluid treatment modules may be arranged in series or in parallel, or a combination of both.

The system may comprise a cleaning arrangement adapted to facilitate cleaning or flushing or the like of the fluid treatment module. The cleaning arrangement may comprise a back washing arrangement. The cleaning system may be operated by one or more eductors. The eductors for use in the cleaning arrangement may be operated or provided with motive fluid from the pump of the system.

Aspects of the present invention also relate to various uses of the fluid treatment system defined in the first aspect.

According to a second aspect of the present invention there is provided a method of treating a fluid, said method comprising the steps of:

establishing a first fluid pressure differential between a fluid inlet and a first fluid outlet of a fluid treatment module using at least one of a pump and an eductor;

establishing a second fluid pressure differential between the fluid inlet and a second fluid outlet of the fluid treatment module with the other of the pump and eductor;

communicating a portion of fluid from the pump to the eductor to be used as an eductor motive fluid; and permitting a fluid to be treated to flow through the fluid treatment module by the first and second fluid pressure differentials.

The method may be carried out within a fluid treatment system, such as that system described above with reference to the first aspect above. In this respect the method may comprise the step of immersing at least a portion of the fluid treatment system in a fluid, which fluid may be the fluid to be treated. The method may comprise the step of locating at least a portion of the fluid treatment system in a subsea location, for example on a seabed. The method may further comprise the step of permitting fluid communication of ambient fluid with the fluid treatment module.

According to a third aspect of the present invention there is provided a fluid injection apparatus comprising the fluid treatment system according to the first aspect.

According to a fourth aspect of the present invention there is provided a method of injecting a fluid into a subterranean formation utilizing the system of the first aspect.

According to a fifth aspect of the present invention there is provided a fluid treatment system comprising:

a fluid treatment module comprising a fluid inlet and first and second fluid outlets;

a pump defining a suction port and a delivery port;

an eductor defining a suction port, a delivery port and a motive fluid port;

wherein at least one of the first and second outlets of the fluid treatment module is in fluid communication with the suction port of at least one of the pump and eductor, and wherein the delivery port of the pump is in fluid communication with the motive fluid port of the eductor.

According to a sixth aspect of the present invention there is provided a subsea fluid treatment system comprising:

a fluid treatment module adapted to be immersed within seawater and comprising a fluid inlet and first and second fluid outlets, wherein the fluid inlet is adapted to receive ambient seawater;

a pump adapted to establish a first pressure differential between the fluid inlet and one of the first and second fluid outlets of the fluid treatment module; and an eductor adapted to establish a second pressure differential between the fluid inlet and the other of the first and second fluid outlets of the fluid treatment module, wherein the pump is adapted to deliver a motive fluid to the eductor.

BRIEF DESCRIPTION OF THE DRAWINGS

These and other aspects of the present invention will now be described, by way of example only, with reference to the accompanying drawings, in which FIGS. 1 to 7 are diagrammatic representations of respective fluid treatment systems in accordance with seven alternative embodiments of the present invention.

DETAILED DESCRIPTION OF THE DRAWINGS

As defined above, one aspect of the present invention relates to a fluid treatment system and associated methods of use. This treatment system may be utilised in a number of different applications. However, for clarity and brevity the following embodiments are described in the context of treating a fluid for injection into a subterranean formation.

Figure 1:
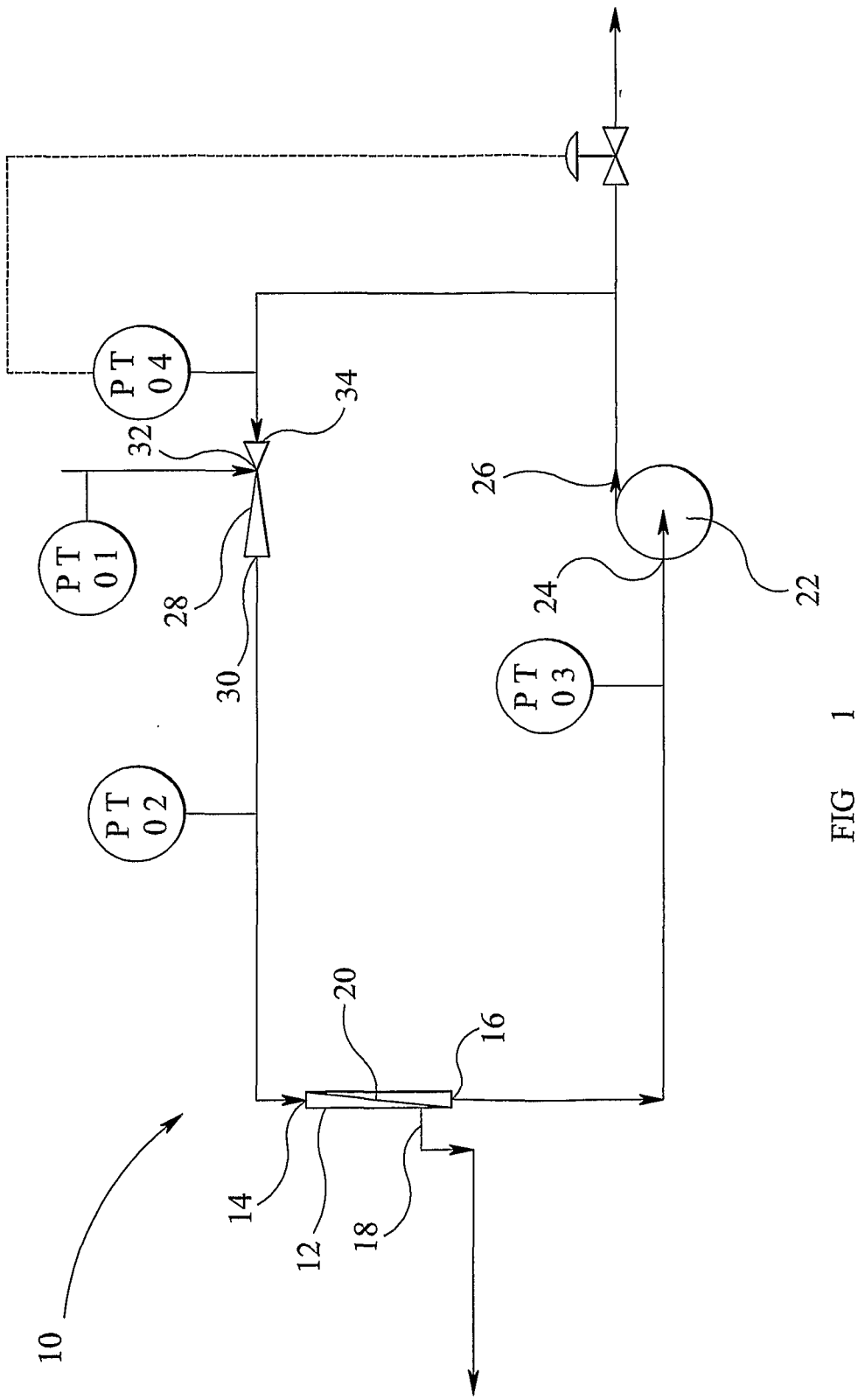

Referring first to FIG. 1, a fluid treatment system, generally identified by reference numeral 10, is shown. The system 10 is located at a subsea location and as will be described in detail below treats ambient seawater prior to being injected into a subterranean formation.

The system 10 comprises a fluid treatment module 12 which defines a fluid inlet 14, a first fluid outlet 16 and a second fluid outlet 18. The module 12 comprises at least one filtration membrane 20 mounted therein which is arranged to treat seawater passing therethrough by separating components therefrom. The membrane type may be selected in accordance with the particular treatment required. For example, for substantially complete particulate matter and ionic species removal a reverse osmosis membrane may be utilised. Alternatively, for selective ionic species removal, such as sulphate ions, a nano-filtration membrane may be utilised.

Fluid which has passed through the membrane 20, and thus has a low concentration of excluded components, exits the module 12 via the first fluid outlet 16 as the permeate. This permeate may then be injected into a subterranean formation. As such, the module 12 functions to condition the seawater prior to injection, for example to render the seawater compatible with the formation chemistry.

Fluid which has not passed through the membrane 20, and thus has a relatively higher concentration of excluded components, exits the module 12 via the second fluid outlet 18 as the retentate. This retentate in the embodiment shown is discharged back into the sea.

In order to ensure the passage of seawater across the membrane 20, a pressure differential between the fluid inlet 14 and first fluid outlet 16 must be established which exceeds the trans-membrane pressure, which may be the osmotic pressure for the membrane type and fluid feed conditions, for example. This pressure differential in the embodiment shown is achieved by a pump 22. Specifically, a suction port 24 of the pump 22 is in fluid communication with the first fluid outlet 16 of the module 12. This arrangement therefore establishes a lower pressure at the first fluid outlet 16 than at the fluid inlet 14.

As the system 10 is immersed within the seawater which is supplied to the module 12, the supplied water will thus have a pressure at least equal to the ambient hydrostatic pressure of the ambient seawater. For example, at a depth of, say, 350 meters, the water will have an ambient pressure of around 36 bar. This ambient pressure therefore ensures that the pump 22 always functions above 0.0 bar, and preferably above its required NPSH. For example, if the pump 22 requires an inlet pressure of at least 5 bar to prevent cavitation then it would be possible, at a depth of around 350 meters, to sustain a trans-membrane (or permeate) pressure drop of 31 bar without risking damage to the pump 22.

The pump 22 also defines a delivery port 26 from which the permeate may be discharged and injected downhole. As such, the pump 22 functions as an injection pump. Any suitable pump may be utilised as would be readily selected by those of skill in the art. For example, a rotodynamic pump, such as a centrifugal or axial flow pump may be utilised.

In relation to the retentate flow, as noted above this is drawn in from the ambient environment and then discharged back into this environment. Accordingly, to achieve net fluid flow in the desired direction a pressure differential must also be established between the fluid inlet 14 and second fluid outlet 18. In the present embodiment this is achieved by an eductor 28. Specifically, a delivery port 30 of the eductor 28 is in fluid communication with the fluid inlet 14 of the module 12. This arrangement therefore establishes a higher pressure at the fluid inlet 14 than at the second fluid outlet 18, achieving flow from the fluid inlet 14 to the second fluid outlet 18.

The eductor 28 also defines a suction port 32 which receives seawater. Furthermore, the eductor 32 defines a motive fluid port 34. The motive fluid port 34 is in fluid communication with the delivery port 26 of the pump 22. Accordingly, a portion of the pressurised fluid from the pump 22 may be delivered to the eductor 28 to be utilised as the motive fluid for operation.

Accordingly, the present invention permits the required pressure differentials across the fluid treatment module to be established utilising only a single mechanical assembly, specifically pump 22. This therefore reduces the complexities and costs of the system 10.

By virtue of using fluid from the pump 22, which has already been treated in the module 12, as the motive fluid for the eductor 28, the flux rate of the membrane 20 may be improved and a degree of control may be facilitated. For example, the volume of water from the pump 22 may be controlled according to the required flux output.

Figure 2:
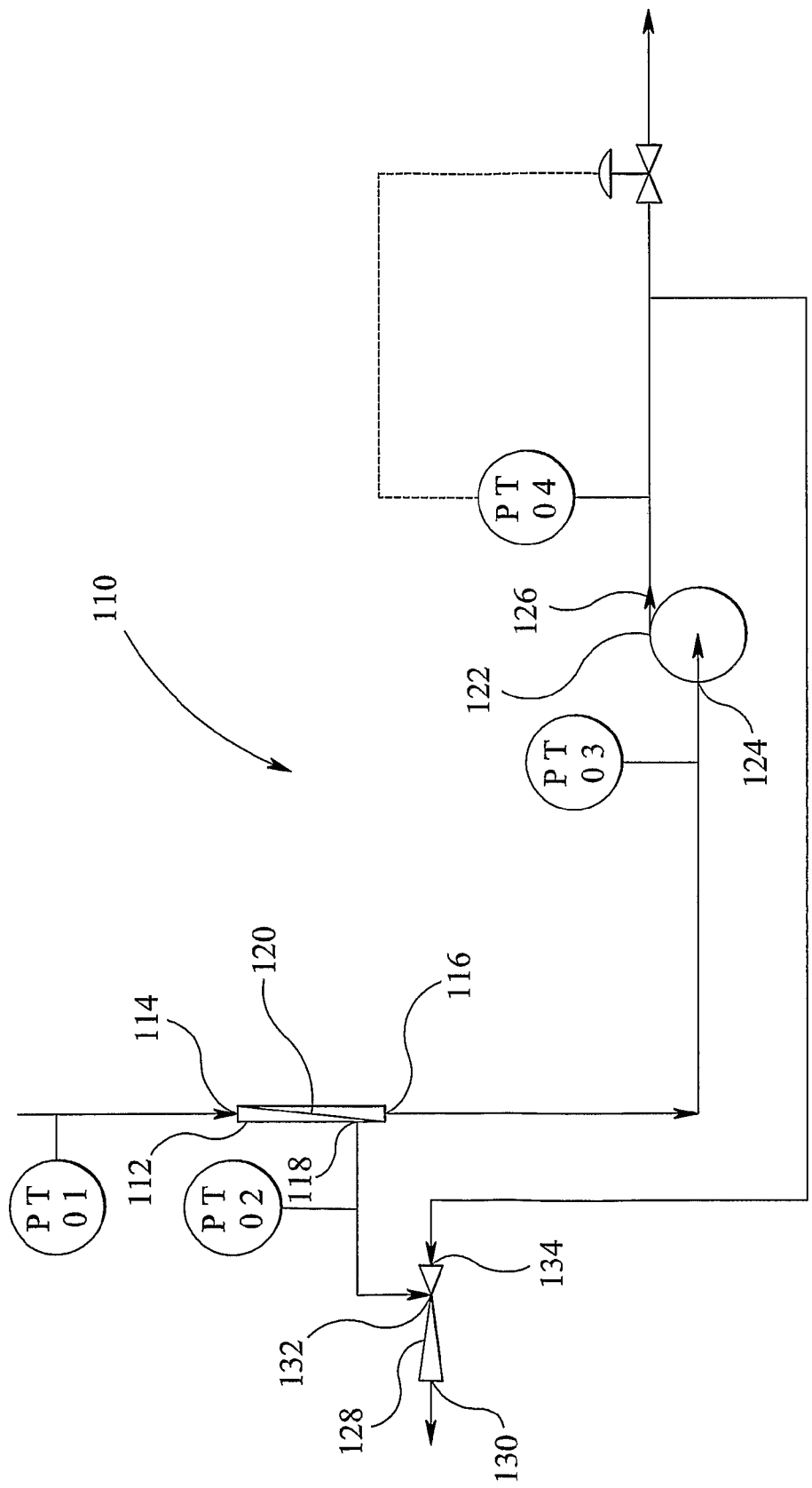
Figure 3:
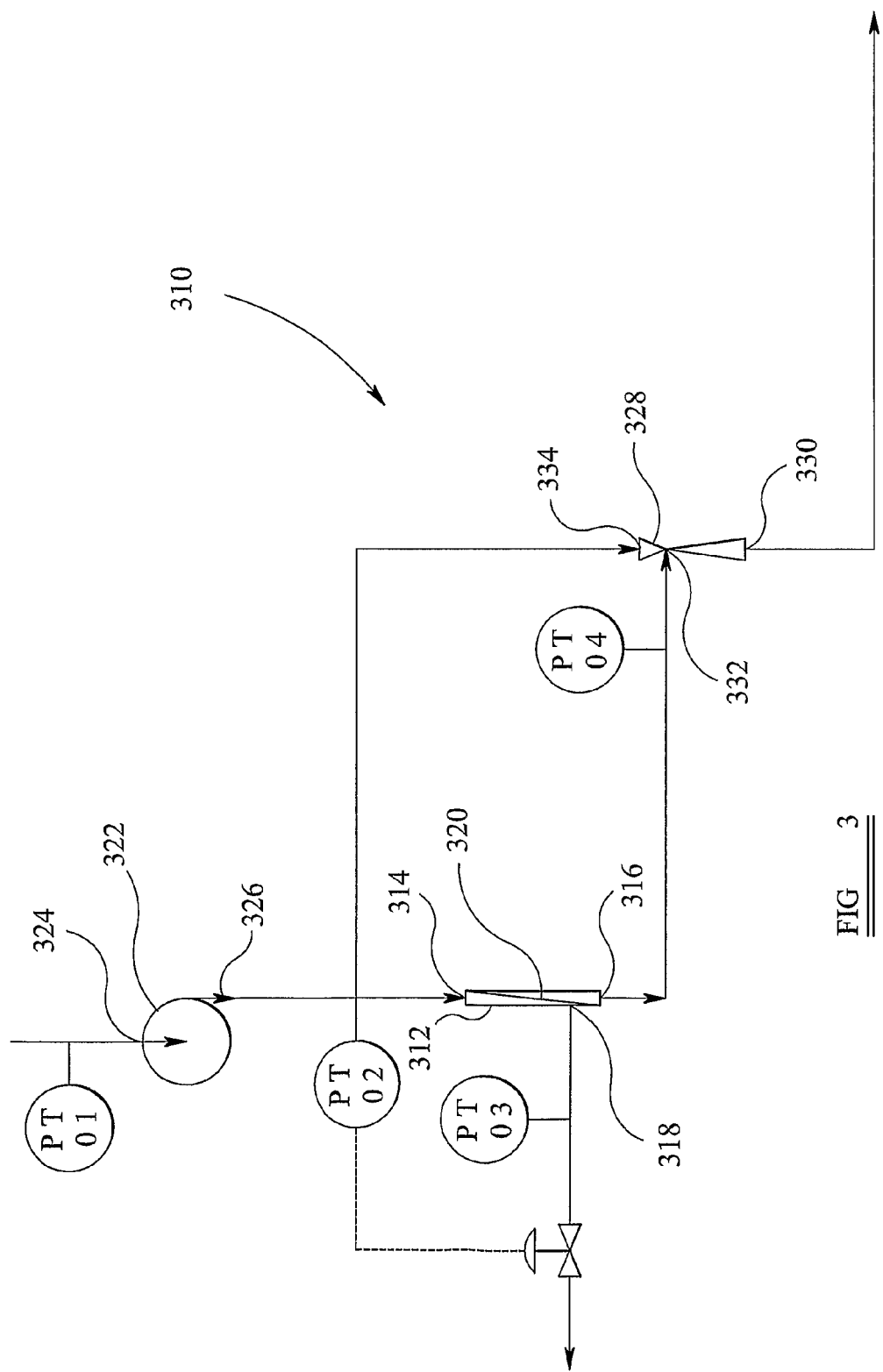
Figure 4:
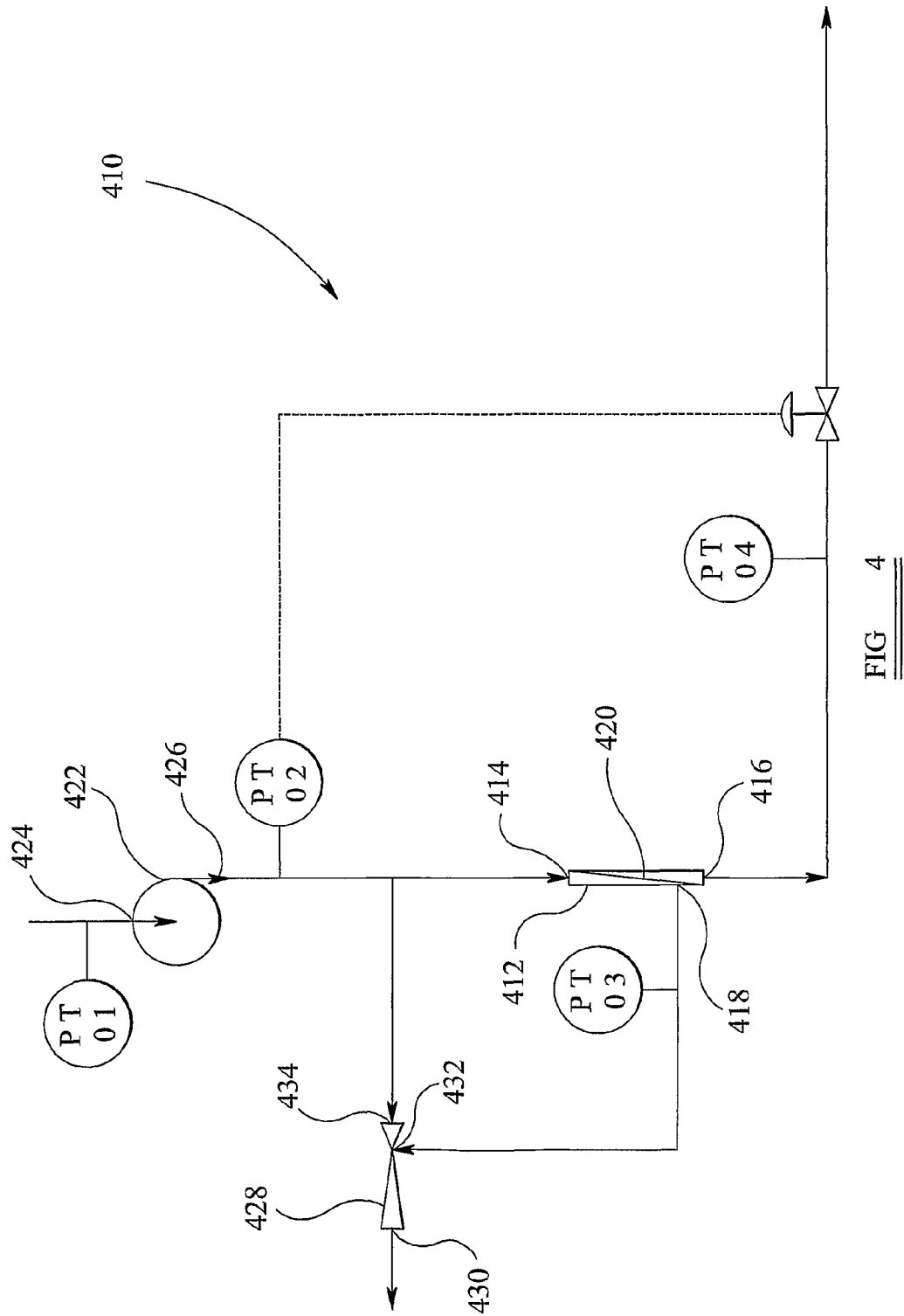
Figure 5:
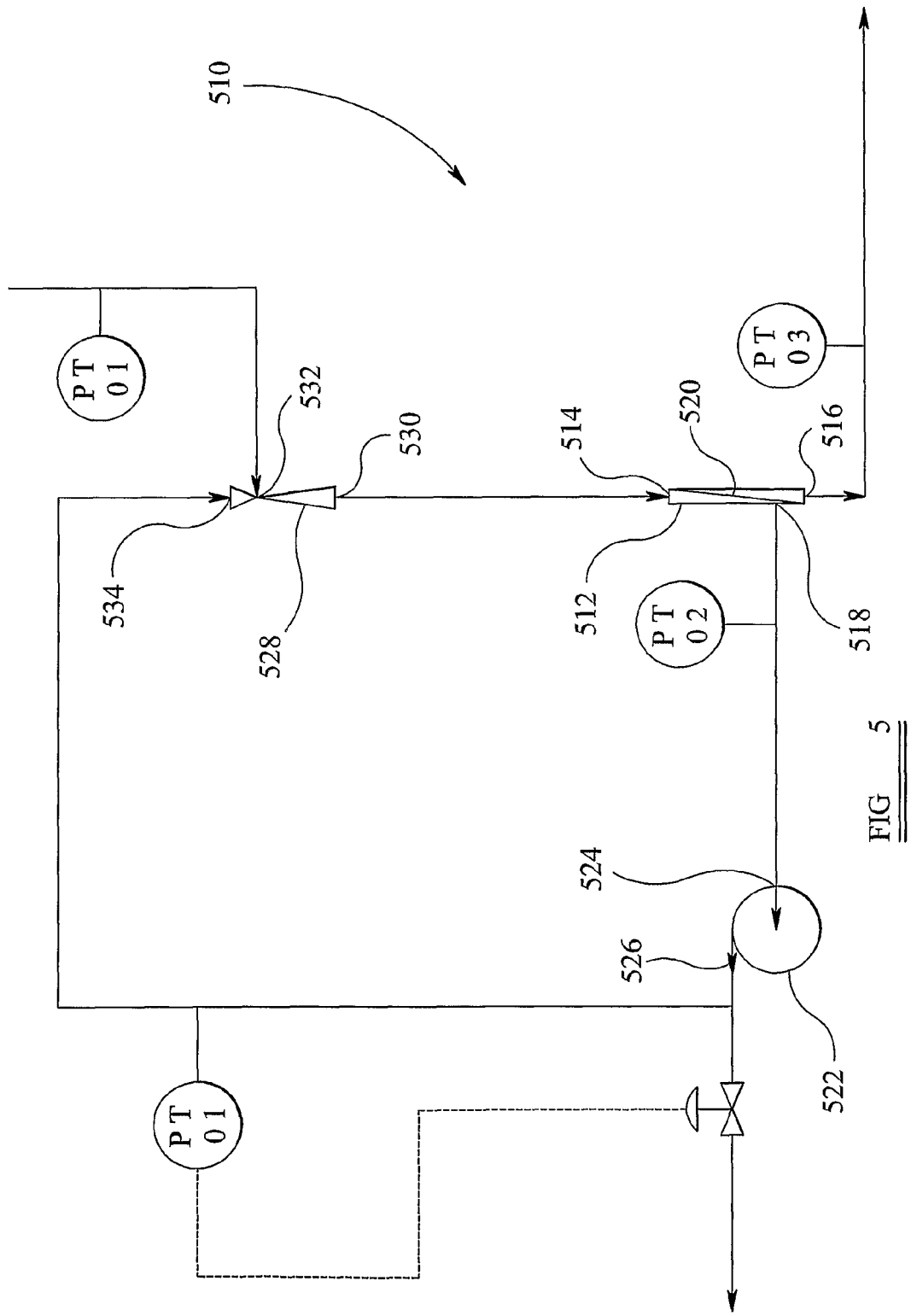
Figure 6:
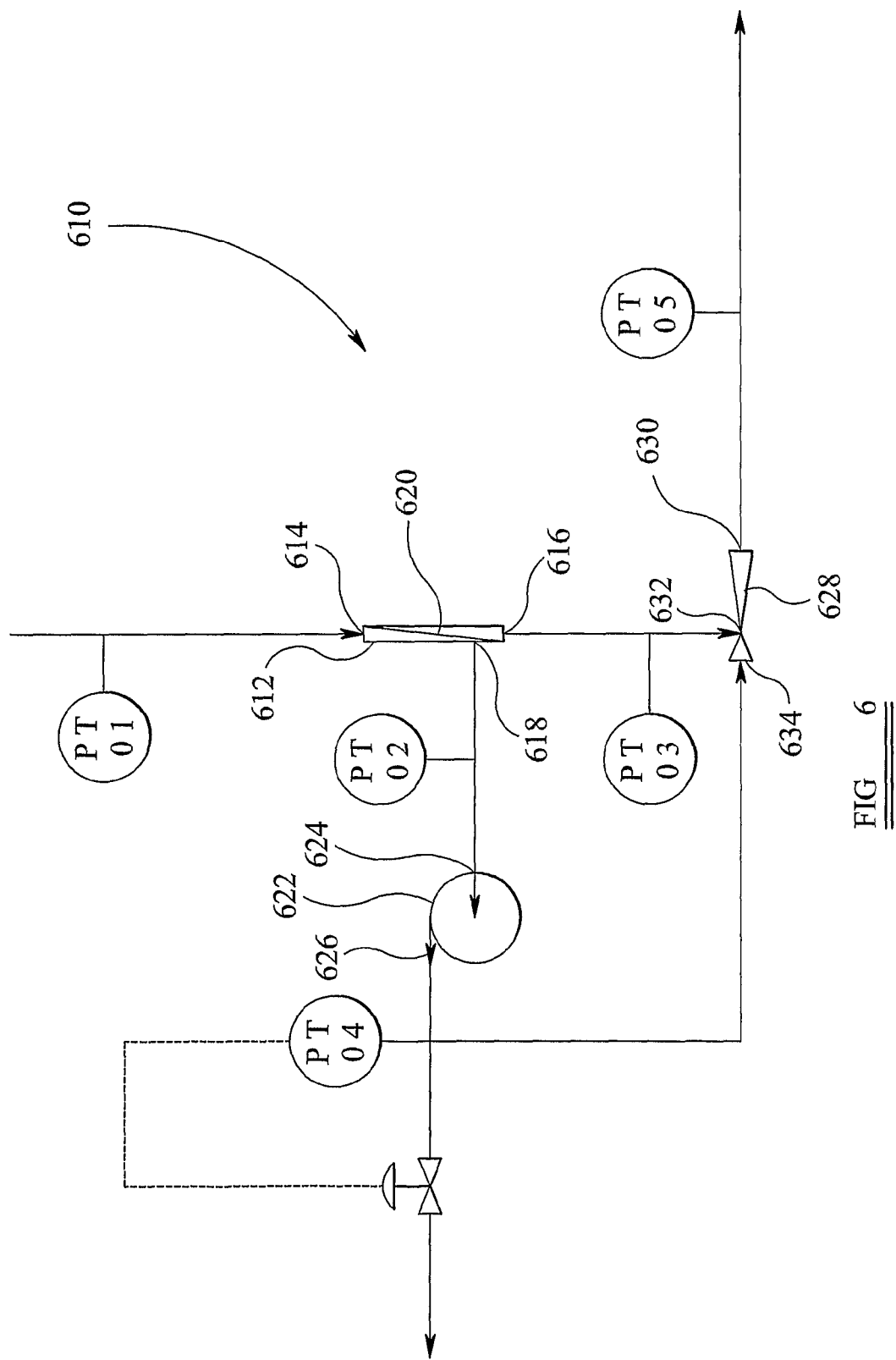

A second embodiment of the present invention is shown in FIG. 2, reference to which is now made. The fluid treatment system, in this case generally identified by reference numeral 110 is similar to that shown in FIG. 1, and as such like components share like reference numerals, incremented by 100. As such, the system 110 includes a fluid treatment module 112, a pump 122 and an eductor 128. However, in the present case a suction port 132 of the eductor 128 is in fluid communication with a second outlet 118 of the module 112, thus ensuring that the pressure at the second outlet 118 is lower than that at the inlet 114.

Third to sixth embodiments of the invention are shown in FIGS. 3 to 6 respectively. In each case, the systems shown are similar to that first presented in FIGS. 1 and 2. As such like features share like reference numerals with FIG. 2, incremented in each case by 100.

Thus, the presented exemplary embodiments demonstrate the flexibility of the systems in relation to the alternative locations of the pump and eductor. For example: the delivery port of the pump may be in communication with the inlet of the fluid treatment module, with corresponding placement of the eductor; the suction port of the pump may be in fluid communication with the second fluid outlet of the module, with corresponding placement of the eductor. It will be recognised that many further arrangements of the components of the systems, including additional components such as further fluid treatment modules, pumps and eductors, are possible. For example, the eductor may be reversed to make a pressure gain in the opposite direction to the flow—i.e. to function like a restriction valve. This may have application in for example, the nuclear industry where this might be done to avoid a valve which could wear and/or leak. However, for brevity these further combinations and variations have not been included.

Also, in FIGS. 3 to 6 the labels "to injection well" and "seawater discharge" which appeared in FIGS. 1 and 2 have been replaced with "destination p" and "destination r", to demonstrate that the system may be utilised for purposes other than water injection.

A further alternative embodiment is shown in FIG. 7, reference to which is now made. In this case the system is generally identified by reference numeral 710. In this embodiment a combination of a pump 722 and eductor 728 is utilised, with a delivery port 726 of the pump 722 being in fluid communication with a motive fluid port 734 of the eductor 728. However, in this case a plurality of fluid treatment modules are provided in a first bank of modules 712a connected in series with a second bank of modules 712b. In each bank 712a, 712b each membrane is connected in parallel. This arrangement may permit large flux rates to be achieved.

The system 710 in FIG. 7 also includes a backwashing system 750 which incorporates a number of eductors 750a which receive motive fluid also from the pump 722. The eductors 750a of the backwashing system permit the banks of modules 712a to be backwashed as required. Bank 712b may also incorporate a backwashing system.

It should be understood that the embodiments described and shown herein are merely exemplary of the present invention and that various modifications may be made thereto without departing form the scope of the invention. For example, and as noted above, may combinations of pump and eductor relative arrangements are possible. Also, the fluid treatment system described herein may be utilised in many applications.

The invention claimed is:

1. A subsea system for use in treating seawater for injection into a subterranean formation comprising:
    a fluid treatment module comprising a fluid inlet, a first fluid outlet for treated seawater with a reduced concentration of a selected component, and a second fluid outlet for treated seawater with an increased concentration of the selected component;
    an educator having a motive fluid port, a delivery port, and a suction port;
    a pump having an inlet and an outlet;
    wherein the delivery port of the educator is in fluid communication with the fluid inlet of the fluid treatment module;
    wherein the second fluid outlet of the fluid treatment module is configured for disposal of the treated seawater with the increased concentration of the selected component into the ambient sea, and the suction port of the educator is configured to received ambient seawater from the ambient sea;
    wherein the pump inlet is in fluid communication with the first fluid outlet of the fluid treatment module for receiving the treated seawater with the reduced concentration of the selected component; and
    wherein the subsea system is configured for communication of the treated seawater with the reduced concentration of the selected component from the pump outlet to a subterranean formation and for communication of the treated seawater with the reduced concentration of the selected component from the pump outlet to the motive fluid port of the educator so as to entrain seawater from the ambient sea through the suction port of the educator for delivery through the delivery port of the educator to the fluid inlet of the fluid treatment module at a pressure which is greater than a pressure of the ambient sea.

2. The subsea system according to claim 1, wherein the selected component comprises at least one of particulate components and ionic components.

3. The subsea system according to claim 1, wherein the fluid treatment module comprises at least one filtration or separation medium.

4. The subsea system according to claim 3, wherein the filtration or separation medium comprises a membrane.

5. The subsea system according to claim 3, wherein the filtration or separation medium comprises at least one of a reverse osmosis membrane, nano-filtration membrane and ultra-filtration membrane.

6. The subsea system according to claim 3, wherein the filtration or separation medium comprises at least one of a strainer and sieve.

7. The subsea system according to claim 1, wherein the first fluid outlet is configured to accommodate a permeate, and the second fluid outlet is configured to accommodate a retentate.

8. The subsea system according to claim 7, wherein at least one of the permeate and retentate defines a useable product.

9. The fluid treatment system according to claim 1, wherein the fluid treatment module comprises a plurality of fluid inlets and more than two fluid outlets, with appropriate pressure differentials established across selected inlets and outlets.

10. The subsea system according to claim 1, comprising a plurality of fluid treatment modules.

11. The subsea system according to claim 1, comprising a cleaning arrangement adapted to facilitate cleaning of the fluid treatment module.

12. The subsea system according to claim 11, wherein the cleaning arrangement is operated by one or more eductors, wherein the eductors are operated with motive fluid from the pump.

13. A method for treating seawater subsea comprising:
locating a fluid treatment module subsea, the fluid treatment module comprising a fluid inlet, a first fluid outlet for treated seawater with a reduced concentration of a selected component, and a second fluid outlet for treated seawater with an increased concentration of the selected component;
communicating the treated seawater with the increased concentration of the selected component from the second fluid outlet of the fluid treatment module to the ambient sea;
communicating the treated seawater with the reduced concentration of the selected component from the first fluid outlet of the fluid treatment module to an inlet of a pump;
communicating the treated seawater with the reduced concentration of the selected component from an outlet of the pump to a subterranean formation;
communicating the treated seawater with the reduced concentration of the selected component from the outlet of the pump to a motive fluid port of an educator so as to entrain seawater from the ambient sea through a suction port of the educator and deliver seawater through a delivery port of the educator to the fluid inlet of the fluid treatment module at a pressure which is greater than a pressure of the ambient sea.

14. A subsea system for use in treating seawater for injection into a subterranean formation comprising:
a fluid treatment module comprising a fluid inlet, a first fluid outlet for treated seawater with a reduced concentration of a selected component, and a second fluid outlet for treated seawater with an increased concentration of the selected component;
an eductor having a motive fluid port, a delivery port, and a suction port; and
a pump having an inlet and an outlet,
wherein the pump inlet is in fluid communication with the first fluid outlet of the fluid treatment module for receiving the treated seawater with the reduced concentration of the selected component,
wherein the subsea system is configured for communication of the treated seawater with the reduced concentration of the selected component from the pump outlet to a subterranean formation, and
wherein the subsea system is configured for communication of the treated seawater with the reduced concentration of the selected component from the pump outlet to the motive fluid port of the eductor, the delivery port of the eductor is configured for fluid communication with the ambient sea, the fluid inlet of the fluid treatment module is configured to receive ambient seawater from the ambient sea and the suction port of the eductor is in fluid communication with the second fluid outlet of the fluid treatment module so as to lower the pressure at the second fluid outlet of the fluid treatment module below that of the ambient sea and entrain the treated seawater with the increased concentration of the selected component through the suction port of the eductor for disposal through the delivery port of the eductor into the ambient sea.

15. A method for treating seawater subsea comprising:
locating a fluid treatment module subsea, the fluid treatment module comprising a fluid inlet, a first fluid outlet for treated seawater with a reduced concentration of a selected component, and a second fluid outlet for treated seawater with an increased concentration of the selected component;
communicating the treated seawater with the reduced concentration of the selected component from the first fluid outlet of the fluid treatment module to an inlet of a pump;
communicating the treated seawater with the reduced concentration of the selected component from an outlet of the pump to a subterranean formation;
exposing the fluid inlet of the fluid treatment module and a delivery port of an eductor to the ambient sea and communicating the treated seawater with the reduced concentration of the selected component from the outlet of the pump to a motive fluid port of the eductor so as to lower a pressure at a suction port of the eductor below that of the ambient sea and entrain the treated seawater with the increased concentration of the selected component from the second fluid outlet of the fluid treatment module for disposal of the treated seawater with the increased concentration of the selected component through the delivery port of the eductor into the ambient sea.

16. The subsea system of claim 1 wherein the outlet of the pump is connected to a first line that leads to an inlet of a valve and wherein the valve includes two valve outlets that are connected to second and third lines wherein the second line conveys treated seawater with the reduced concentration of the selected component to the subterranean formation and the third line conveys treated seawater with the reduced concentration of the selected component to the motive fluid port of the eductor.

17. The subsea system of claim 16 wherein the suction port of the eductor is open to the seawater and wherein the treated seawater entering the motive fluid port of the eductor is operative to induce seawater into the eductor via the suction port.

* * * * *